UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SELF-LAYING-TRACK TRACTOR.

1,413,147.          Specification of Letters Patent.    Patented Apr. 18, 1922.

Application filed January 24, 1918.   Serial No. 213,470.

*To all whom it may concern:*

Be it known that I, ELMER E. WICKERSHAM, a citizen of the United States, residing at Stockton, in the county of San Joaquin and State of California, have invented a new and useful Improvement in Self-Laying-Track Tractors, of which the following is a specification.

This invention relates to tractors which are supported entirely on self-laying tracks and are steered by varying the speed of the tracks relatively to one another.

A more particular description of the type of tractor involved appears in my co-pending application Ser. No. 212,383, filed January 18, 1918. In the tractor shown and described in this application steering is effected by applying or releasing brakes to vary the operation of planetary gears interposed between the drive sprockets and the drive shaft. Although this construction affords facility of control and a fair range of variation in the operation of the tracks it has been found desirable, particularly in military operations, to increase this control and range to a greater extent, without employing greater motive power or a greater number of main driving gears.

The principal object of the present invention is to accomplish this result and, moreover, to eliminate the friction losses due to the brake controls heretofore employed. In effecting these results, auxiliary gearing is arranged in conjunction with the transmission mechanism shown in my copending application, in a manner to positively control and drive the frame or spider on which the planetary reducing gears are carried, so that the drive sprockets may be driven forward or reverse at various speeds in unison or independently of each other without changing the engagement of the main driving gears.

A preferred form of the invention is exemplified in the following description and illustrated in the accompanying drawings, in which—

As shown in the drawings, the particular embodiment of the invention shown herein comprises a motor 10, carried upon roller trucks 11. These roller trucks are arranged with their rollers bearing on the ground run of endless, self-laying tracks 12 which are carried by idler wheels 13 and drive sprockets 14. In the type of tractor here shown, the idler wheels 13 are journaled on roller trucks 11, while drive sprockets 14 are carried on a drive shaft journaled in the transmission mechanism housing in a manner to be described presently.

Power to drive the tracks is delivered from the motor to a propeller shaft 15 through a suitable master clutch preferably encased in a crank case 16 and provided with a pedal 17. The rear end of shaft 15 is journaled in the transmission mechanism housing 18 on roller bearings 19 and geared directly, through gears 20, to a secondary shaft 21, also journaled in the housing 18 on roller bearings 22. From shaft 21 power is transmitted through bevel gears 23 to a transverse drive shaft 24, journaled in roller bearings 25 carried in extensions 26 formed on the sides of the housing 18. The outer ends of shaft 24 project beyond extensions 26 and are fitted with internally geared drive sprockets indicated generally at 14.

Carried within sprocket wheels 14 and connected to the ends of the drive shaft 24 are planetary gear mechanisms by which the relative speed of the drive sprockets may be varied. Since both of these mechanisms are alike the description will be simplified by explaining only one of them.

Figure 7:
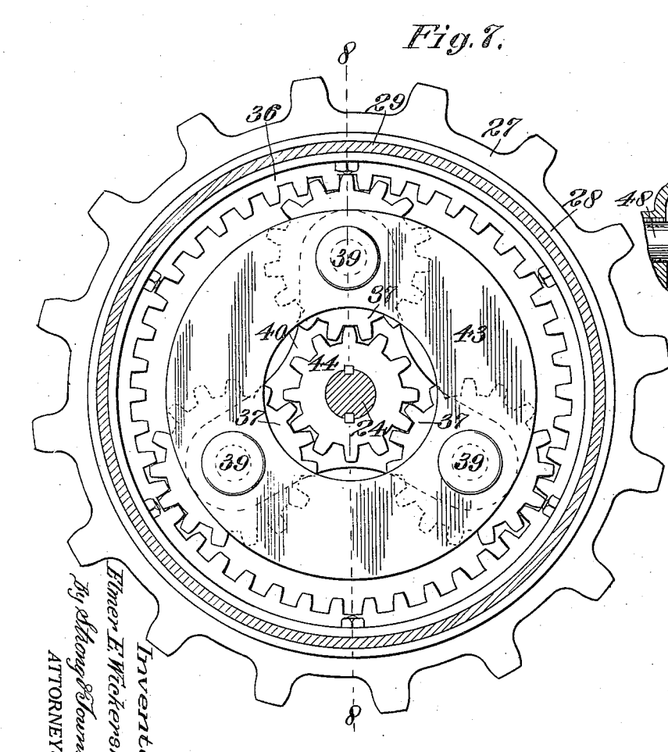
Fig. 7 is an elevational, sectional view of one of the drive sprockets, taken on line 7—7 of Fig. 8.
Figure 8:
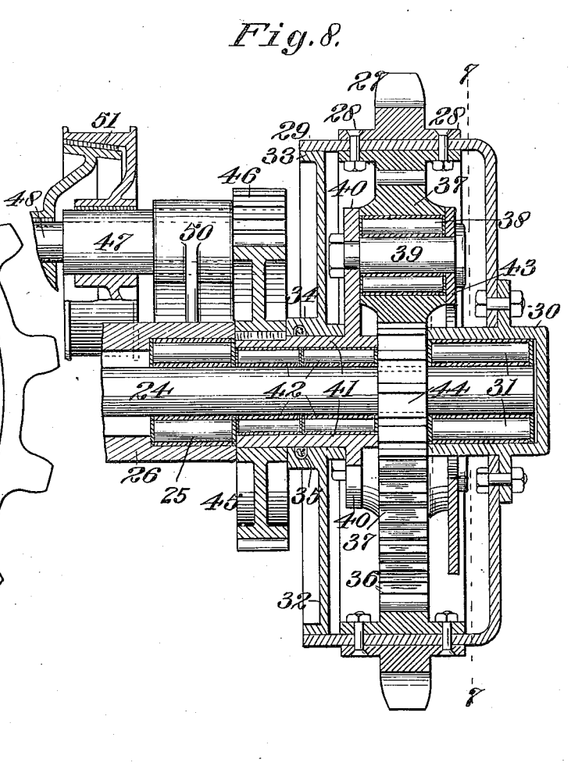
Fig. 8 is a cross sectional view on line 8—8 of Fig. 7.

Referring to Figs. 7 and 8, it will be seen that the sprocket wheel comprises an outer toothed rim 27, preferably of cast steel and formed with laterally extending flanges 28 by which the rim may be secured in place upon a pressed steel drum or hub 29. The flanges 28 also serve as a support for the rails of the track while passing around the wheel. The outer end of the drum or hub 29 is preferably formed integral with the cylindrical sides of said hub and provided with a central aperture in which is secured a journal box 30, fitted with roller bearings 31 to receive the ends of the drive shaft 24. The inner end of the hub is closed by means of a disk 32, having a flange 33 at its outer edge by which it may be secured to the walls of the hub. A collar 34, formed about a circular aperture at the center of disk 32 serves as an inner bearing for the sprocket wheel as a whole. The interior of the collar 34 is provided with an oil retaining felt washer 35. The hub of the sprocket wheel thus forms an oil and dust-proof case which may be partly filled with oil to lubricate the encased gears and bearings.

The hub 29 is driven by means of an annular internal gear 36, secured interiorly thereof, and meshing with a set of planetary gears 37, journaled on roller bearings 38 and pins 39 carried by arms 40 formed on a sleeve 41. This sleeve is journaled within and extends outwardly from the collar 34 and surrounds the shaft 24 upon which it is rotatably carried by means of roller bearings 42. The outer ends of pins 39 are secured in position by means of a circular plate 43 provided at spaced intervals with holes through which said pins are inserted, as shown in Fig. 7. Gears 37 are driven by a pinion 44 keyed on shaft 24 between the bearings 42 and 31.

It is obvious that by the above described construction planetary reduction gears are interposed between the driving member or drive shaft 24 and the driven member or sprocket wheel 14, and their function is positively controlled by auxiliary gearing which operates to drive the planetary gear frame or sleeve 41 at speeds which not only vary the rate of rotation of the drive sprockets but reverse the direction of their rotation as well. This auxiliary gearing comprises a gear wheel 45, secured exteriorly of the hub 29 and keyed on the outer extension of sleeve 41. Gear wheel 45 meshes with a pinion 46 keyed on a sleeve 47 rotatably carried on the outer end of a transverse auxiliary driving or controlling shaft 48. This shaft is suitably journaled in the housing 18 on bearings 49, the outer ends of the shaft being journaled within the sleeve 47 which in turn is journaled in a bracket 50 formed on or secured to extension 26 of the housing 18.

Suitable means are provided to controllably unite or connect shaft 48 with sleeve 47, the means here shown comprising a cone clutch 51 operated by means of a hand lever 52, a link 53 and a bell crank 54. The controlling shaft 48 may be driven at suitable speeds by means of a bevel pinion 55, carried on a sleeve 56, rotatably journaled in the housing 18 on roller bearings 57. The sleeve 56 is rotatably fitted over the end of the propeller shaft 15 and is indirectly driven by said shaft through sliding gears 58 and 59 splined on said sleeve and engageable with gears 60 and 61, the gears 60 and 61 being keyed to the secondary shaft 21 which, as previously explained, is permanently connected through gears 20 to the shaft 15.

Figure 1:
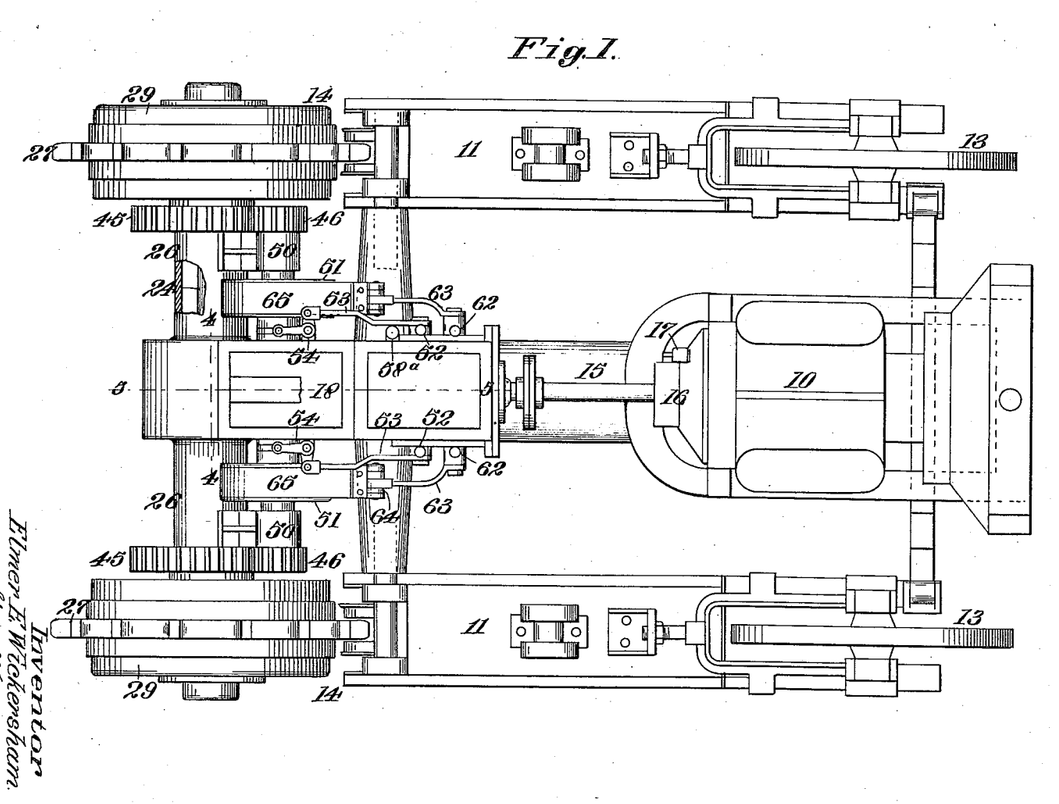
Fig. 1 is a plan view of a tractor embodying the invention, the endless tracks being removed.
Figure 2:
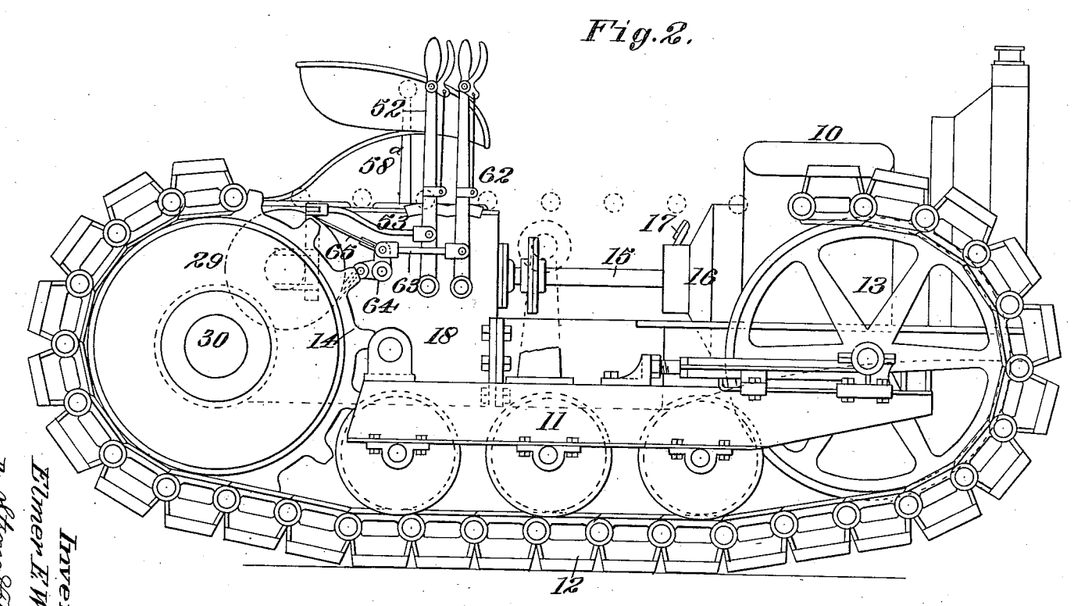
Fig. 2 is a side elevation of the tractor, the upper run of the endless tracks being diagrammatically represented in dotted lines.
Figure 3:
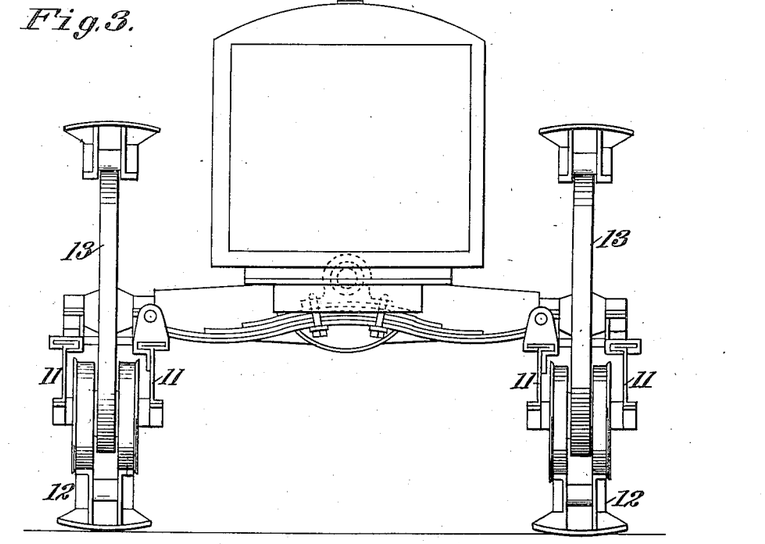
Fig 3 is a front elevation of the forward portion of the tractor, the forward vertical run of the tracks being removed.
Figure 4:
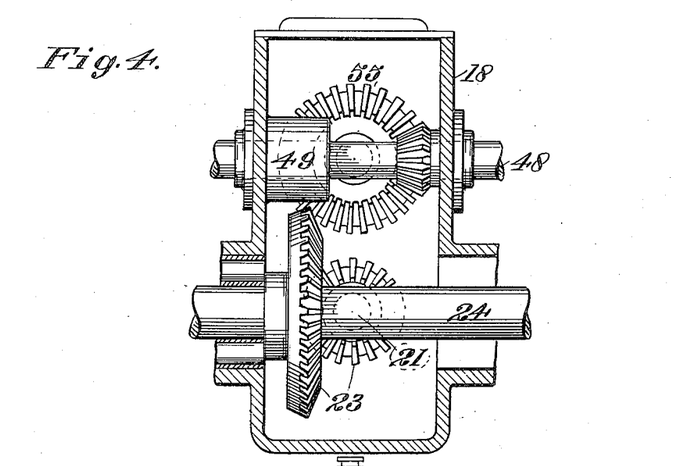
Fig. 4 is a cross sectional view on line 4—4 of Fig. 1, showing the bevel gearing for the main and auxiliary drive shafts.
Figures 5, 6:
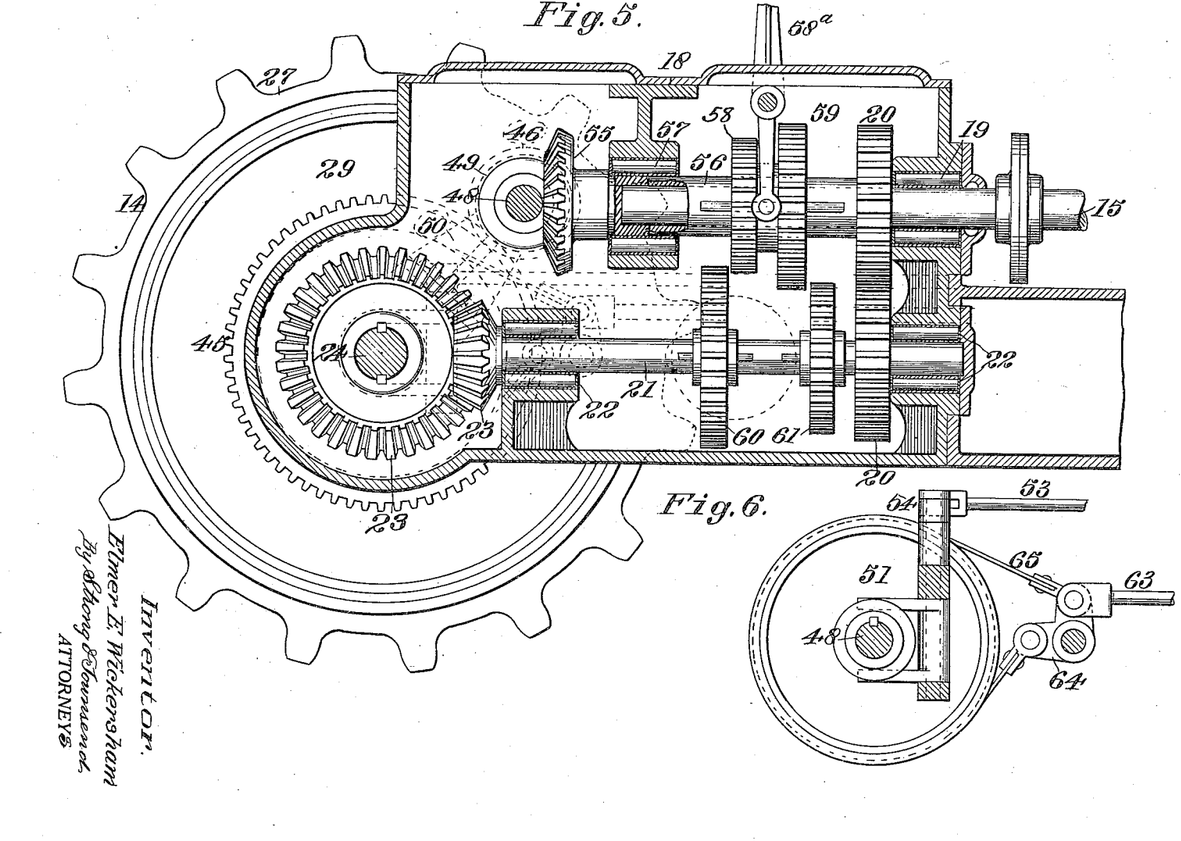
Fig. 5 is a cross sectional view on line 5—5 of Fig. 1.
Fig. 6 is a detail side elevation of one of the auxiliary controlling clutches.

The sliding gears 58 and 59 are preferably formed integral in the usual manner and provided with an actuating lever 58$^a$ by which gear 58 may be brought into engagement with the gear 60 or gear 59 with gear 61, or both gears 58 and 59 may be placed in neutral position, as shown in Fig. 5. The sliding gears thus provided serve to positively drive the controlling shaft at two different speeds, one causing a reduced forward drive and the other a reverse drive in a manner to be explained presently. It is, however, to be understood that this construction is purely diagrammatic and illustrative, it being the purpose of the invention that the sleeve 56 be provided with gears suitable to drive the controlling shaft at as many different speeds as the particular application of the invention may require.

With the gear arrangement shown, two positive speeds forward and one reverse may be obtained without varying the engagement of the main driving gears. Thus with the sliding gears in neutral or disengaged position and the driven members of the clutches 51 held fast by means of hand levers 62, links 63, bell cranks 64 and brake bands 65, power is transmitted through the gears 20 to the shaft 21 from shaft 15. Shaft 21 will in turn drive the shaft 24 and pinions 44. The planetary gears 37 being held in a fixed position relatively to the shaft 24 will be made to rotate on their axes by the pinions 44 and thus drive the internal gears 36 and the connected drive sprocket. This operation is the normal high speed forward drive. In other words, to drive forward at high speed the clutches 51 are disengaged and the brakes 65 applied, power being transmitted directly through the main drive shafts 21 and 24 to the drive sprockets.

To drive forward at a reduced speed without changing to second or low gear by shifting the lever 58$^a$, the brakes may be slightly released or slipped, thus allowing the sleeves 41 and the connected gears 37 to rotate at a speed somewhat slower than that of the pinions 44. It is obvious that by applying or releasing these brakes while the gears 58 and 59 remain in neutral position all variations in speed from normal drive ahead to a total stop may be obtained. This operation, however, is merely an auxiliary one to be used, preferably, for short intervals only.

The normal reduced drive forward is obtained by shifting the lever 58ª to engage the gears 59 and 61, and releasing the brakes 65, the clutches 51 being engaged or in. Sleeve 41 is thus positively driven at a speed less than that of the pinions 44 and a continual reduced speed results. For certain purposes it may be desirable to have several such reduced speeds forward and any number of suitable gears, such as 58 and 59, could be employed to that end.

To reverse the direction of travel it is only necessary to engage gear 58 with gear 60, with the brakes 65 off and the clutches 51 in. The control shaft then drives sleeve 41 in the same direction as the pinions 44 as usual but at a greater speed than that of said pinions. The result is that the internal gears 36 are driven backward and a reverse drive is obtained.

The operations described so far have all been ones in which both tracks or drive sprockets have been operated in unison. Before considering the operation by which turning is effected it should be noted that in the first mentioned operations it is not necessary, though sometimes convenient, to slip either the brakes or clutches, it being possible to have a positive drive at all times. It is also to be noted that by disengaging the master clutch the brakes 65 may be used as service brakes to hold the vehicle as a whole while descending grades.

As each drive sprocket may be driven independently of the other in the above situations, it will be apparent to those skilled in the art that while traveling forward one track may be driven at a greater speed than the other in either of several ways. Thus one track may be driven at normal forward drive while the other may be driven at the fixed reduced drive or at a variable reduced drive obtained by slipping the corresponding clutch or brake band.

To illustrate, by releasing one of the clutches 51 by means of the lever 52 and applying the corresponding brake 65 by means of the lever 62, the corresponding track will be driven forward at normal forward speed or in high gear. If, during this operation, the opposite clutch 51 be held in by its lever 62, the gears 59 and 61 being brought into engagement by means of the lever 58ª, the opposite track will be positively driven forward at a speed less than that of the track, causing the tractor to turn in the well-known manner. Similarly, while one track is being driven forward at high speed, as described above, the opposite track may be driven at speeds varying from full speed to a total stop by disengaging its clutch 51 and applying, slipping or totally releasing its brake 65 by means of the lever 62. A somewhat similar result could, of course, be obtained by slipping the above-mentioned clutch 51 instead of using the brake 65.

It is also possible, of course, to drive one track forward and the other in a reverse direction, because while the auxiliary controlling shaft is turning at the high speed necessary to cause one drive sprocket to drive in a reverse direction, it is possible to disengage the clutch connecting said shaft to the gearing of the opposite sprocket and apply the respective brake in the proper manner to obtain the normal forward drive in that sprocket.

Thus, while the gears 58 and 60 are engaged, if one of the clutches 51 be disengaged and the brake 65 applied to its driven member while the opposite clutch is in, the track on the side of the disengaged clutch will be driven forward at full speed and the opposite track will be driven backward at full speed.

While traveling backward, the above described variations may also be obtained, with the exception that the speed of either of the sprockets relative to the other cannot be varied except by slipping its respective clutch, because it is necessary that one or the other of the clutches be engaged to impart to the corresponding sleeve or planetary gear frame the high speed necessary to cause a reverse rotation.

It is manifest that many changes in the construction and arrangement of the parts of the above described mechanism could be resorted to without departing from the spirit of my invention as set forth in the appended claims.

Having thus described my invention, what I claim and desire to secure by Letters Patent is—

1. A self-laying track tractor, comprising a pair of endless chain tracks, truck frames having rollers engaging the ground run of the tracks, driving and carrying wheels about which the tracks travel, a rear axle for the driving wheel and a transmission steering mechanism including speed-changing gears carried by the driving wheels, steering mechanism driven thereby, operating around said axle whereby said wheels may be driven forward or reverse at various speeds in unison or independently of each other.

2. A self-laying track tractor, comprising a pair of endless chain tracks, truck frames having rollers engaging the ground run of the tracks, driving and carrying wheels about which the tracks travel, and a transmission steering mechanism including speed-changing gears carried interiorly of the driving wheels, and operating around the axis thereof whereby said wheels may be driven forward or reverse at various speeds in unison or independently of each other.

3. A self-laying track tractor, comprising a pair of endless chain tracks, truck frames having rollers engaging the ground run of the tracks, driving and carrying wheels about which the tracks travel, and a transmission steering mechanism including speed-changing planetary gears carried interiorly of the driving wheels, and operating around the axis thereof whereby said wheels may be driven forward or reverse at various speeds in unison or independently of each other.

4. A tractor comprising a motor, a self-laying track mechanism secured to either side thereof, each of said mechanisms comprising an endless chain track, a truck frame having rollers engaging the ground run of the track, driving and carrying wheels about which the track travels, and reduction gears for each driving wheel, and operating around the axis thereof and means to transmit power from the motor to said reduction gears in a manner to drive said tracks forward or reverse at various speeds in unison or independently of each other.

5. In a traction engine having its entire weight supported upon a pair of self-laying tracks actuated by drive sprockets, the combination of means for steering the engine comprising speed changing gears carried interiorly of each drive sprocket, and means whereby the operation of said gears may be varied to drive the tracks forward or reverse at various speeds in unison or independently of each other.

6. In a traction engine having its entire weight supported upon a pair of self-laying tracks actuated by drive sprockets, the combination of means for steering the engine comprising planetary gears carried interiorly of each drive sprocket, and positively driven auxiliary gears, whereby the operation of the speed-changing gears may be varied to steer the traction engine and drive it in either direction.

7. In a traction engine having its entire weight supported upon a pair of self-laying tracks actuated by drive sprockets, the combination of means for steering the engine comprising planetary gears for each drive sprocket, and positively driven auxiliary gears, whereby the operation of the speed-changing gears may be varied to steer the traction engine and drive it in either direction.

8. In a traction engine having its entire weight supported upon a pair of self-laying tracks actuated by drive sprockets, the combination of means for steering the engine comprising drive sprockets having self-contained, speed-changing mechanisms, and auxiliary gears and controlling means whereby the operation of said speed-changing mechanisms may be varied to drive the tracks forward or reverse at various speeds in unison or independently of each other.

9. A transmission steering mechanism for self-laying track tractors comprising a drive shaft, drums rotatably journaled on said shaft, a toothed rim carried exteriorly of each drum and an internal gear carried interiorly of each of said drums, planetary gearing interposed between and connecting the drive shaft and the internal gears, and positively driven controlling means to control the operation of said planetary gearing in unison or independently of each other.

10. A transmission steering mechanism for self-propelled vehicles comprising driven members having hubs forming oil-tight drums, a drive shaft on which said drums are journaled, and a transmission mechanism including gearing within said drums, whereby the drive shaft may drive the driven members forward independently or in unison at various speeds or in a reverse direction.

11. The combination with the drive shaft of a self-laying track tractor, of a drive sprocket having a toothed rim and provided with an internal gear, planetary gears connecting the drive shaft and the internal gear, and positively driven means to control the planetary gears in a manner to cause the drive sprocket to rotate in either direction or at various speeds.

12. A transmission steering mechanism for self-propelled vehicles comprising driven propelling members having hubs forming oil-tight drums, a drive shaft on which said drums are journaled, pinions thereon, an internal gear carried interiorly of each of said drums, sleeves rotatably carried on the drive shaft and extending into each drum, planetary gears carried by said sleeves and meshing with the internal gears and pinions on the drive shaft, and positively driven means to control the operation of said planetary gears.

13. A transmission steering mechanism for self-propelled vehicles comprising driven propelling members having hubs forming oil-tight drums, a drive shaft on which said drums are journaled, pinions thereon, an internal gear carried interiorly of each of said drums, sleeves rotatably carried on the drive shaft and extending into each drum, planetary gears carried by said sleeves and meshing with the internal gears and pinions on the drive shaft, positively driven means to control the operation of said planetary gears, said means comprising a gear wheel carried by each sleeve, an auxiliary drive shaft geared thereto, and means to drive the auxiliary drive shaft at various speeds.

14. A transmission steering mechanism for self-propelled vehicles comprising driven propelling members having hubs forming oil-tight drums, a drive shaft on which said drums are journaled, pinions thereon, an internal gear carried interiorly of each of said drums, sleeves rotatably carried on the drive shaft and extending into each drum, planetary gears carried by said sleeves and meshing with the internal gears and pinions on the drive shaft, positively driven means to control the operation of said planetary gears, said means comprising a gear wheel carried by said sleeve, a divided auxiliary drive shaft provided with connecting clutches and controlling brakes, and means to drive the auxiliary drive shaft at various speeds.

15. A transmission steering mechanism for self-propelled vehicles comprising driven propelling members having hubs forming oil-tight drums, a drive shaft on which said drums are journaled, pinions thereon, an internal gear carried interiorly of each of said drums, sleeves rotatably carried on the drive shaft and extending into each drum, planetary gears carried by said sleeves and meshing with the internal gears and pinions on the drive shaft, positively driven means to control the operation of said planetary gears, said means comprising a gear wheel carried by said sleeve, a divided auxiliary drive shaft provided with connecting clutches and controlling brakes, and means to drive the auxiliary drive shaft at various speeds, said last named means comprising sliding gears engageable with gears connected to the drive shaft.

16. The combination of a pair of driven members, a drive member, planetary gearing between the drive member and each driven member, rotatable means interposed between opposite planetary gear sets and connected to a speed changing element in each of the latter for controlling the same, and power operated means for actuating said last mentioned control means whereby to produce a differential and reverse rotation of said driven members.

17. A driving mechanism for self-propelled vehicles comprising a driven propelling member having hubs forming an oil-tight drum, a drive shaft on which said member is journaled, reduction gears carried within said drum and connecting said shaft and said driven member, and positively driven controlling means, whereby said reduction gears may be operated to drive the propelling member forward or reverse or at various speeds.

18. A driving mechanism for self-propelled vehicles comprising a driven propelling member having a hub forming an oil-tight drum, a drive shaft on which said drum is journaled, an internal gear carried interiorly of said drum, a pinion on said shaft, a sleeve rotatably carried on the drive shaft and extending into the drum, planetary gears carried by said sleeve and meshing with the internal gear and the pinion on the drive shaft, and positively driven means to control the operation of said planetary gears.

19. A driving mechanism for self-propelled vehicles comprising a driven propelling member having a hub forming an oil-tight drum, a drive shaft on which said drum is journaled, an internal gear carried interiorly of said drum, a pinion on said shaft, a sleeve rotatably carried on the drive shaft and extending into the drum, planetary gears carried by said sleeve and meshing with the internal gear and the pinion on the drive shaft, positively driven means to control the operation of said planetary gears, said means comprising a gear wheel carried by the sleeve, an auxiliary drive shaft geared thereto, and means to drive the auxiliary drive shaft at various speeds.

20. A driving mechanism for self-propelled vehicles comprising a driven propelling member having a hub forming an oil-tight drum, a drive shaft on which said drum is journaled, an internal gear carried interiorly of said drum, a pinion on said shaft, a sleeve rotatably carried on the drive shaft and extending into the drum, planetary gears carried by said sleeve and meshing with the internal gear and the pinion on the drive shaft, positively driven means to control the operation of said planetary gears, said means comprising a gear wheel carried by the sleeve, an auxiliary drive shaft provided with a controlling clutch and brake, and means to drive the auxiliary drive shaft at various speeds.

21. A driving mechanism for self-propelled vehicles comprising a driven propelling member having a hub forming an oil-tight drum, a drive shaft on which said drum is journaled, an internal gear carried interiorly of said drum, a pinion on said shaft, a sleeve rotatably carried on the drive shaft and extending into the drum, planetary gears carried by said sleeve and meshing with the internal gear and the pinion on the drive shaft, positively driven means to control the operation of said planetary gears, said means comprising a gear wheel carried by the sleeve, an auxiliary drive shaft provided with a controlling clutch and brake, and means to drive the auxiliary drive shaft at various speeds, said last named means comprising sliding gears engageable with gears connected to the drive shaft.

22. The combination of a pair of driven members, a drive member, planetary gearing between the drive member and each driven member rotatable means interposed between opposite planetary gear sets and connected to a speed changing element in each of the latter for controlling the same, power operated means for actuating said last mentioned control means, and operative connections between the power operated means and the control means for actuating the driven members in either direction and at variable speeds.

23. A combination with a pair of driven members and a driving member therefor of a planetary gear set between each driven member and the driving member, power operated means connectible with a speed changing element in each gear set, and means for connecting the said power operated means simultaneously or separately with either or both speed changing elements.

24. A combination with a pair of driven members and a driving member therefor of a planetary gear set between each driven member and the driving member, rotatable means connected with a speed changing element in each gear set and power operated means for actuating said rotatable means simultaneously or separately.

25. The combination with a pair of driven members and a driving member therefor of a planetary gear set between each driven member and the driving member, each gear set including a revolvable spider carrying the intermediate gears, normally inactive means connected with said spiders for controlling the latter and power operated means for separately or simultaneously actuating said last mentioned means whereby to vary the effective driving speed of either or both planetary gear sets.

26. A transmission steering mechanism for self-propelled vehicles comprising driven propelling members, reduction gears for each of said members, a variable speed transmission mechanism, and means acting through said variable speed mechanism and said reduction gears to drive the propelling members forward or reverse at various speeds in unison or independently of each other.

27. A transmission steering mechanism for self-propelled vehicles, comprising driven propelling members having hubs forming oil-tight drums, planetary gears within said drums, a variable speed transmission mechanism, and means acting through said planetary gears and said variable speed mechanism to drive the propelling members forward or reverse at various speeds in unison or independently of each other.

28. A variable speed mechanism for self-propelled vehicles, comprising a driven propelling member, planetary reduction gears for said member, a variable speed transmission mechanism, and means acting through said planetary gears and said variable speed mechanism to drive the propelling member forward or reverse at various speeds.

29. A variable speed mechanism for self-propelled vehicles comprising a driven propelling member having a hub forming an oil-tight drum, planetary reduction gears within said drum, a variable speed transmission mechanism, and means acting through said planetary gears and said variable speed mechanism to drive the propelling member forward or reverse at various speeds.

30. A variable speed mechanism for self-propelled vehicles comprising a driven propelling member, a drive shaft on which said propelling member is journaled, planetary reduction gears for said member, a variable speed transmission mechanism, and means acting through said planetary gears and said variable speed mechanism to drive the propelling member forward or reverse at various speeds.

31. A variable speed mechanism for self-propelled vehicles comprising a driven propelling member having a hub forming an oil-tight drum, a drive shaft on which said propelling member is journaled, planetary reduction gears within said drum, a variable speed transmission mechanism, and means acting through said planetary reduction gears and said variable speed mechanism to drive the propelling mechanism forward or reverse at various speeds.

32. A transmission steering mechanism for self-propelled vehicles comprising driven propelling members having hubs forming oil-tight drums, a drive shaft on which said propelling members are journaled, planetary gears within said drums, a variable speed transmission mechanism, and means acting through said planetary gears and said variable speed mechanism to drive the propelling members forward or reverse at various speeds in unison or independently of each other.

33. The combination with a pair of driving members and a drive member therefor of a planetary gear set between each driven member and the drive member, each gear set including a revoluble spider carrying the intermediate gears, and normally inactive power operated means for controlling said spiders, and clutch devices for establishing a driving connection between the power operated means and spiders whereby to drive the latter separately or simultaneously for producing a change in the driving speed or a differential rotation of the planetary gear sets.

34. In a transmission mechanism for tractors, the combination with a driving element, a driven element, a planetary gear set having one part connected to the driving element and another part connected to the driven element, and an intermediate speed changing device, of power operated means for actuating said speed changing device at variable speeds.

35. In a transmission mechanism for tractors, the combination with a driving element, a driven element, a planetary gear set having one part connected to the driving element and another part connected to the driven element, and an intermediate speed changing device, of power operated means for actuating said speed changing device, and means included in said operated means for varying the speed and direction of movement of said driven element.

36. In a transmission mechanism for tractors, and the like, a driving element, a pair of driven elements, a planetary gear set, between the driving element and each driven element, including an internal gear from which the final drive is taken, planet gears for varying the speed of the internal gear, a sun gear connected to the driving element for operating the planet gears, and positively driven means connected with planet gears for varying the speed and direction of movement of the internal gears.

37. In a transmission mechanism for tractors, and the like, a driving element, a pair of driven elements, a planetary gear set, between the driving element and each driven element, including an internal gear from which the final drive is taken, planet gears for varying the speed of the internal gear, a sun gear connected to the driving element for operating the planet gears, and means actuated by the driving element and operatively connected with the planet gears for varying the speed and direction of movement of the internal gears, separately or in unison.

38. In a tractor, a power operated driving element, a pair of driven elements actuated by the same, a planetary gear set interposed in the connections between the power operated driving element and each driven element, said planetary gear sets, each including a controllable element to vary the speed of the connected driven elements, connections between the power operated means and controllable elements for operating the latter, and shiftable and change speed gears included in said connections.

39. In a tractor, a power operated driving element, a pair of driven elements actuated by the same, a planetary gear set interposed in the connections between the power operated driving element and each driven element, said planetary gear sets, each including a controllable element to vary the speed of the connected driven elements, connections between the power operated means and controllable elements for operating the latter, and shiftable and change speed gears included in said connections, and controllable clutches interposed in said connections for separately or simultaneously actuating said controllable elements of the planetary gear sets.

In testimony whereof I have hereunto set my hand in the presence of two subscribing witnesses.

ELMER E. WICKERSHAM.

Witnesses:
W. W. HEALEY,
M. E. EWING.